(12) United States Patent
Aoki et al.

(10) Patent No.: US 10,698,395 B2
(45) Date of Patent: Jun. 30, 2020

(54) AIR-CONDITIONING APPARATUS AND METHOD OF DETECTING ABNORMALITY IN TRANSMISSION LINE

(71) Applicant: Mitsubishi Electric Corporation, Tokyo (JP)

(72) Inventors: Tatsuya Aoki, Tokyo (JP); Mario Sato, Tokyo (JP); Jun Someya, Tokyo (JP); Shigeo Takata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 71 days.

(21) Appl. No.: 16/084,337

(22) PCT Filed: Apr. 15, 2016

(86) PCT No.: PCT/JP2016/062059
§ 371 (c)(1),
(2) Date: Sep. 12, 2018

(87) PCT Pub. No.: WO2017/179180
PCT Pub. Date: Oct. 19, 2017

(65) Prior Publication Data
US 2019/0072944 A1    Mar. 7, 2019

(51) Int. Cl.
*G05B 23/02* (2006.01)
*F24F 11/56* (2018.01)
(Continued)

(52) U.S. Cl.
CPC .............. *G05B 23/02* (2013.01); *F24F 11/30* (2018.01); *F24F 11/38* (2018.01); *F24F 11/50* (2018.01);
(Continued)

(58) Field of Classification Search
CPC ........ F24F 11/56; F24F 11/38; G05B 19/0428
See application file for complete search history.

(56) References Cited

U.S. PATENT DOCUMENTS

| | | | | |
|---|---|---|---|---|
| 3,937,978 A | * | 2/1976 | Owenby, Jr. | H02J 3/14 307/41 |
| 4,100,426 A | * | 7/1978 | Baranowski | H02J 3/14 307/35 |
| 2016/0306003 A1 | * | 10/2016 | Heller | F24F 11/38 |

FOREIGN PATENT DOCUMENTS

| | | |
|---|---|---|
| JP | H08-161681 A | 6/1996 |
| JP | 2008-144973 A | 6/2008 |

(Continued)

OTHER PUBLICATIONS

International Search Report ("ISR") dated Jul. 19, 2016 issued in corresponding International patent application No. PCT/JP2016/062059 (and English translation).

*Primary Examiner* — Alvaro E Fortich
(74) *Attorney, Agent, or Firm* — Posz Law Group, PLC

(57) ABSTRACT

In an air-conditioning apparatus and a method of detecting an abnormality in a transmission line, the air-conditioning apparatus includes plural facility apparatuses which are connected to each other by a transmission line and communicate with each other. One of the plural facility apparatuses includes: a transmission circuit including an abnormality detection comparator which detects an abnormality in the transmission line, the transmission circuit being provided to detect the abnormality in the transmission line; and a data storage device which stores a reception signal and signal voltage wave-height information indicating that the abnormality in the transmission line is detected. The transmission circuit further compares a voltage value of a reception signal received from another of the plural facility apparatuses through the transmission line with a threshold value set in advance in the abnormality detection comparator.

6 Claims, 5 Drawing Sheets

(51) Int. Cl.
*F24F 11/38* (2018.01)
*G05B 19/042* (2006.01)
*F24F 11/89* (2018.01)
*F24F 11/50* (2018.01)
*F24F 11/88* (2018.01)
*F24F 11/30* (2018.01)
*G05B 15/02* (2006.01)

(52) U.S. Cl.
CPC .............. *F24F 11/56* (2018.01); *F24F 11/88* (2018.01); *F24F 11/89* (2018.01); *G05B 19/0428* (2013.01); *G05B 15/02* (2013.01); *G05B 2219/2614* (2013.01)

(56) References Cited

FOREIGN PATENT DOCUMENTS

| | | |
|---|---|---|
| JP | 2014-033349 A | 2/2014 |
| WO | 2014/188574 A1 | 11/2014 |

* cited by examiner

AIR-CONDITIONING APPARATUS AND METHOD OF DETECTING ABNORMALITY IN TRANSMISSION LINE

CROSS REFERENCE TO RELATED APPLICATION

This application is a U.S. national stage application of PCT/JP2016/062059 filed on Apr. 15, 2016, the contents of which are incorporated herein by reference.

TECHNICAL FIELD

The present invention relates to an air-conditioning apparatus to be applied to a multi-air-conditioning apparatus for a building, or the like, and to a method of detecting an abnormality in a transmission line.

BACKGROUND ART

In a related-art air-conditioning system, a data collecting device is provided to analyze an abnormality, for example, a failure, when the abnormality occurs (see, for example, patent literature 1). Such a data collecting device collects and stores operation data on an air-conditioning apparatus. The data collecting device described in patent literature 1 collects various operation data such as a set temperature and an alarm code, and stores the operation data and the alarm code in a memory. The operation data is transmitted between an outdoor unit and an indoor unit. The alarm code is included in the operation data, and obtained by encoding contents of a failure at the time of occurrence of the failure.

More specifically, the data collecting device fetches operation data transmitted through a transmission line into a transmission circuit, and the operation data is decoded in the transmission circuit. Then, the data collecting device detects an abnormality by detecting an alarm code included in the obtained operation data by means of an abnormality detector, and then stores the operation data in the memory.

CITATION LIST

Patent Literature

Patent Literature 1: Japanese Unexamined Patent Application Publication No. 2008-144973

SUMMARY OF INVENTION

Technical Problem

As described above, the data collecting device included in the related-art air-conditioning apparatus detects occurrence of a communication abnormality based on the decoded operation data. Therefore, in such a data collecting device, for example, the amount of attenuation of the operation data in the transmission line is small, and it is therefore impossible to detect such a slight abnormality of the transmission line as to have no influence on decoding, and the decoding is thus allowed to be normally performed.

There is a possibility that such a slight transmission line abnormality described above will progress into a severe transmission line abnormality later to cause a communication abnormality. If a transmission line abnormality occurs, an operation of the air-conditioning apparatus is stopped. This influences on a user. Therefore, in recent years, it has been required that a slight transmission line abnormality can be detected and countermeasures can be taken against the abnormality, before the abnormality influences on the user.

The present invention has been made to solve the above problem of the related-art air-conditioning apparatus, and an object of the invention is to provide an air-conditioning apparatus and a method of detecting a transmission-line abnormality, which are capable of detecting an abnormality in a transmission line connected between facility apparatuses.

Solution to Problem

An air-conditioning apparatus according to one embodiment of the present invention includes plural facility apparatuses which are connected to each other by a transmission line, and communicate with each other, wherein one of the plural facility apparatuses includes: a transmission circuit including an abnormality detection comparator configured to detect an abnormality in the transmission line, the transmission circuit being configured to detect the abnormality in the transmission line; and a data storage device configured to store the reception signal and signal voltage wave-height information indicating that the abnormality in the transmission line is detected, and wherein the transmission circuit is further configured to: compare a voltage value of a reception signal received from another of the plural facility apparatuses through the transmission line with a threshold value set in advance in the abnormality detection comparator; determine that the transmission line is abnormal when the voltage value of the reception signal is smaller than or equal to the threshold value; and produce the signal voltage wave-height information, and store the signal voltage wave-height information together with the reception signal in the data storage device.

Advantageous Effects of Invention

As described above, according to one embodiment of the present invention, the voltage of the received signal is compared with the threshold value of the comparator, whereby the transmission line abnormality in the transmission line connected between the facility apparatuses can be detected.

DESCRIPTION OF EMBODIMENTS

Embodiment 1

An air-conditioning apparatus according to embodiment 1 of the present invention will be described.

When communication is performed between facility apparatuses included in the air-conditioning apparatus through a transmission line, the air-conditioning apparatus detects whether an abnormality occurs in the transmission line based on a received signal.

[Configuration of Air-Conditioning Apparatus]

Figure 1:
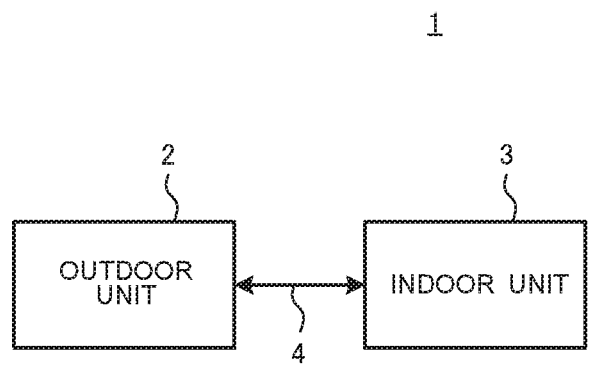
FIG. 1 is a block diagram for illustrating an example of the configuration of an air-conditioning apparatus according to embodiment 1 of the present invention.

FIG. 1 is a block diagram for illustrating an example of the configuration of an air-conditioning apparatus 1 according to embodiment 1.

As illustrated in FIG. 1, the air-conditioning apparatus 1 is made up of facility apparatuses including an outdoor unit 2 and an indoor unit 3. The outdoor unit 2 and the indoor unit 3 are connected to each other by pipes (not shown). Refrigerant circulates through the pipes to achieve a heat exchange cycle, for example, a refrigeration cycle. Also, the outdoor unit 2 and the outdoor unit 3 are connected to each other by a transmission line 4, and communicate with each other through the transmission line 4.

It should be noted that in this example illustrated in the figure, a single outdoor unit 2 and a single indoor unit 3 are connected to each other; however, the example is not limitative; that is, various examples can be considered. For example, plural indoor units 3 may be connected to a single outdoor unit 2.

(Outdoor Unit)

Figure 2:
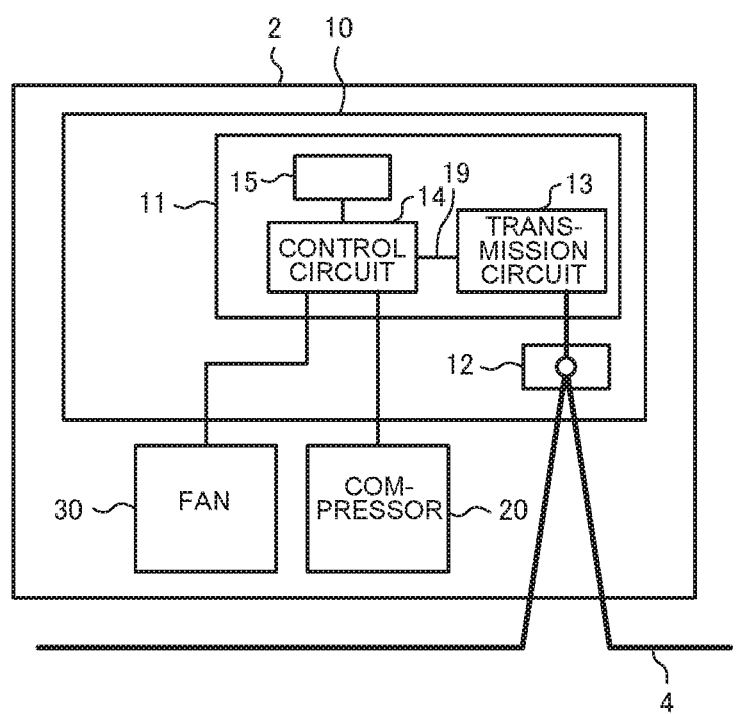
FIG. 2 is a block diagram for illustrating an example of the configuration of an outdoor unit as illustrated in FIG. 1.

FIG. 2 is a block diagram for illustrating an example of the configuration of the outdoor unit 2 as illustrated in FIG. 1.

As illustrated in FIG. 2, the outdoor unit 2, which is one of plural facility apparatuses forming the air-conditioning apparatus 1, includes a control box 10, a compressor 20, and a fan 30. The control box 10 controls the entire outdoor unit 2. The compressor 20 compresses sucked refrigerant and discharges the compressed refrigerant. The fan 30 supplies air to a heat exchanger (not shown). The transmission line 4 connected to the indoor unit 3 is connected to the control box 10, and control lines for transmission of control signals for controlling the compressor 20 and the fan 30 extend from the control box 10. The compressor 20 and the fan 30 are therefore connected to the respective control lines.

The control box 10 includes a control board 11 and a terminal block 12. On the control board 11, various circuits included in the control box 10 are provided. The terminal block 12 connects the transmission line 4 and the control board 11 to each other. Furthermore, the control board 11 includes a transmission circuit 13, a control circuit 14 and a data storage device 15. The transmission circuit 13 and the control circuit 14 are connected to each other by a data signal line 19.

The transmission circuit 13 decodes a reception signal received through the transmission line 4 to convert the reception signal into data to be received (which will be hereinafter referred to as "reception data"), and supplies the reception data to the control circuit 14 through the data signal line 19. Furthermore, based on the received reception signal, the transmission circuit 13 performs processing for determining whether the reception signal can be decoded normally or not and processing for detecting an abnormality in the transmission line 4. Details of various processing to be performed in the transmission circuit 13 will be described later.

When detecting an abnormality in the transmission line 4, the transmission circuit 13 produces signal voltage waveheight information indicating the detection of the abnormality in the transmission line, and stores the information in the data storage device 15, which will be described later.

The control circuit 14 controls each of components provided in included in the outdoor unit 2. For example, the control circuit 14 controls operations of the compressor 20, the fan 30 and other components based on indoor temperature information supplied from the indoor unit 3. Also, the control circuit 14 produces data to be transmitted (which will be hereinafter referred to as "transmission data") to other facility apparatuses through the transmission line 4, and supplies the transmission data to the transmission circuit 13 through the data signal line 19. Furthermore, the control circuit 14 performs error detection processing using a checksum or the like which is included in the reception data supplied from the transmission circuit 13, and determines whether the reception data is normal data or not.

The control circuit 14 is made up of software to be executed on an arithmetic device, for example, a microcomputer or a central processing unit (CPU), hardware such as a circuit device to achieve various types of processing, and other components.

The data storage device 15 stores various information regarding the reception data. To be more specific, when an abnormality in the transmission line 4 is detected, the data storage device 15 stores, for example, the received reception signal and the signal voltage wave-height information produced in the transmission circuit 13.

Figure 3:
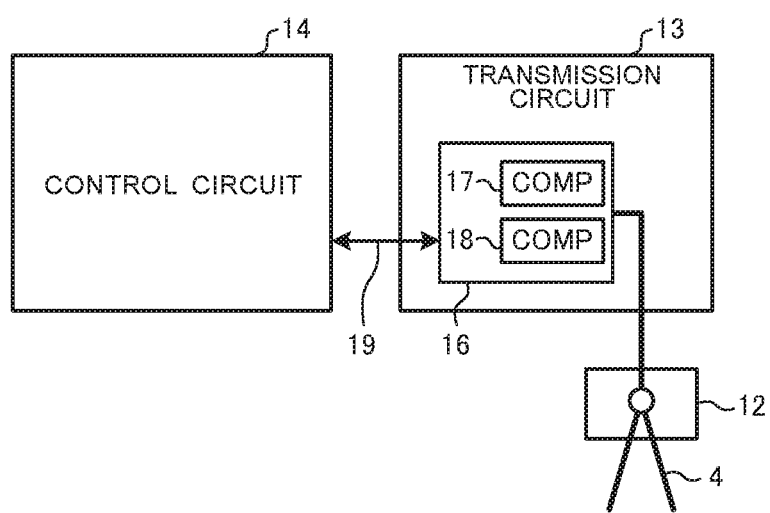
FIG. 3 is a block diagram for illustrating an example of the configuration of a transmission circuit as illustrated in FIG. 2.

FIG. 3 is a block diagram illustrating an example of the configuration of the transmission circuit 13 as illustrated in FIG. 2.

The transmission circuit 13 includes a transmission and reception circuit 16 which allows a signal to be transmitted between the control circuit 14 and the transmission line 4. To the transmission and reception circuit 16, the transmission line 4 is connected through the terminal block 12, and to the transmission and reception circuit 16, the control circuit 14 is connected by the data signal line 19. Furthermore, a decoding comparator 17 and an abnormality detection comparator 18 are provided in the transmission and reception circuit 16.

The decoding comparator 17 is provided to determine whether the reception signal can be decoded normally or not. In the decoding comparator 17, a first threshold value is set in advance. The transmission circuit 13 compares a signal voltage of the reception signal and the first threshold value to determine whether the reception signal can be decoded normally or not.

The abnormality detection comparator 18 is provided to detect an abnormality in the transmission line 4. In the abnormality detection comparator 18, a second threshold value is set in advance. The second threshold value is set to a value, for example, greater than the first threshold value. Also, the second threshold value is set in consideration of the signal voltage of a reception signal which is received when the transmission line 4 has no abnormality, and the maximum amount of attenuation which is caused by a line resistance of the transmission line 4.

The transmission circuit 13 compares the signal voltage of the reception signal and a second threshold value with each other to determine whether an abnormality occurs or not in the transmission line 4. Furthermore, as a result of comparison, when it is detected that when the signal voltage of the reception signal is smaller than or equal to or smaller than the second threshold value, the transmission circuit 13 produces information indicating that "the signal voltage of the reception signal is smaller than or equal to the second threshold value" as the above signal voltage wave-height information.

[Operation of Air-Conditioning Apparatus]

An operation of the air-conditioning apparatus 1 according to embodiment 1 will be described.

Each of the facility apparatuses included in the air-conditioning apparatus 1 communicates with any of the other facility apparatuses through the transmission line 4. For example, the outdoor unit 2 of the air-conditioning apparatus 1 communicates with the indoor unit 3 to air-condition a to-be-air-conditioned space. More specifically, for example, in order that indoor temperature information on the to-be-air-conditioned space be acquired from the indoor unit 3, the outdoor unit 2 transmits a signal for requesting transmission of the indoor temperature information to the indoor unit 3 through the transmission line 4. Then, in response to the request, the indoor unit 3 returns the indoor temperature information. As a result, the outdoor unit 2 can acquire the indoor temperature information.

A flow of transmission of the signal during communication between the outdoor unit 2 and the indoor unit 3 will be described as an example.

(Transmission of Signal)

In the case where the outdoor unit 2 transmits a signal to the indoor unit 3, which is another facility apparatus, the control circuit 14 of the outdoor unit 2 supplies transmission data to the transmission circuit 13 through the data signal line 19.

The transmission circuit 13 converts the received transmission data into a transmission signal to be transmitted to the indoor unit 3. Then, the transmission circuit 13 outputs the transmission signal to the transmission line 4 through the terminal block 12. Thereby, the transmission signal output from the outdoor unit 2 is transmitted to the indoor unit 3.

(Reception of Signal)

In the case where the outdoor unit 2 receives a signal from the indoor unit 3, the transmission circuit 13 receives a reception signal through the transmission line 4. Then, the transmission circuit 13 decodes the reception signal into reception data, and supplies the reception data to the control circuit 14 through the data signal line 19.

The following description is made with respect to the case where a transmission abnormality occurs during transmission of a signal between the outdoor unit 2 and the indoor unit 3. For example, in the case where unexpected extrinsic noise is superimposed on a reception signal being transmitted in the transmission line 4, a contact failure occurs between the terminal block 12 and the transmission line 4, or a ground fault occurs in the transmission line 4, attenuation, distortion, or the like occurs in the signal voltage of the reception signal. In such a case, the transmission circuit 13 cannot normally decode the reception signal, and supplies erroneously decoded reception data to the control circuit 14.

Therefore, in embodiment 1, it is determined using the decoding comparator 17 whether the reception signal can be decoded normally or not, and also determined using the abnormality detection comparator 18 whether an abnormality or the like occurs in the transmission line 4 or not. Then, after making the above determination regarding the reception signal by means of the decoding comparator 17 and the above determination regarding whether the abnormality or the like occurs or not in the transmission line 4, by means of the abnormality detection comparator 18, the transmission circuit 13 decodes the reception signal into reception data, and supplies the reception data to the control circuit 14.

Also, the transmission circuit 13 determines whether the abnormality or the like occurs or not in the transmission line 4, using the abnormality detection comparator 18; and when determining that the abnormality occurs in the transmission line 4, the transmission circuit 13 produces the above signal voltage wave-height information, and stores the signal voltage wave-height information together with the reception signal in the data storage device 15.

The control circuit 14 performs error detection processing using a checksum or the like on the reception data supplied from the transmission circuit 13. As a result, in the case it is determined that the reception data is erroneous data, since the data is not normally decoded, the control circuit 14 requests the indoor unit 3, which is a transmission side, to re-transmit a reception signal.

In this case, in the case where the above reception signal cannot be normally decoded because of an unexpected extrinsic noise, a reception signal re-transmitted is decoded by the transmission circuit 13, whereby normal reception data can be acquired. Therefore, the control circuit 14 can continue air-conditioning based on the normal reception data.

By contrast, in the case where the reception signal cannot be normally decoded because of a contact failure between the terminal block 12 and the transmission line 4 or a ground fault occurring in the transmission line 4, normal reception data cannot be acquired even from a reception signal which is transmitted in response to a request for the above re-transmission. Therefore, the control circuit 14 determines that the air-conditioning cannot be continued, and causes the air-conditioning to be stopped.

(Processing for Receiving Reception Signal)

Figure 4:
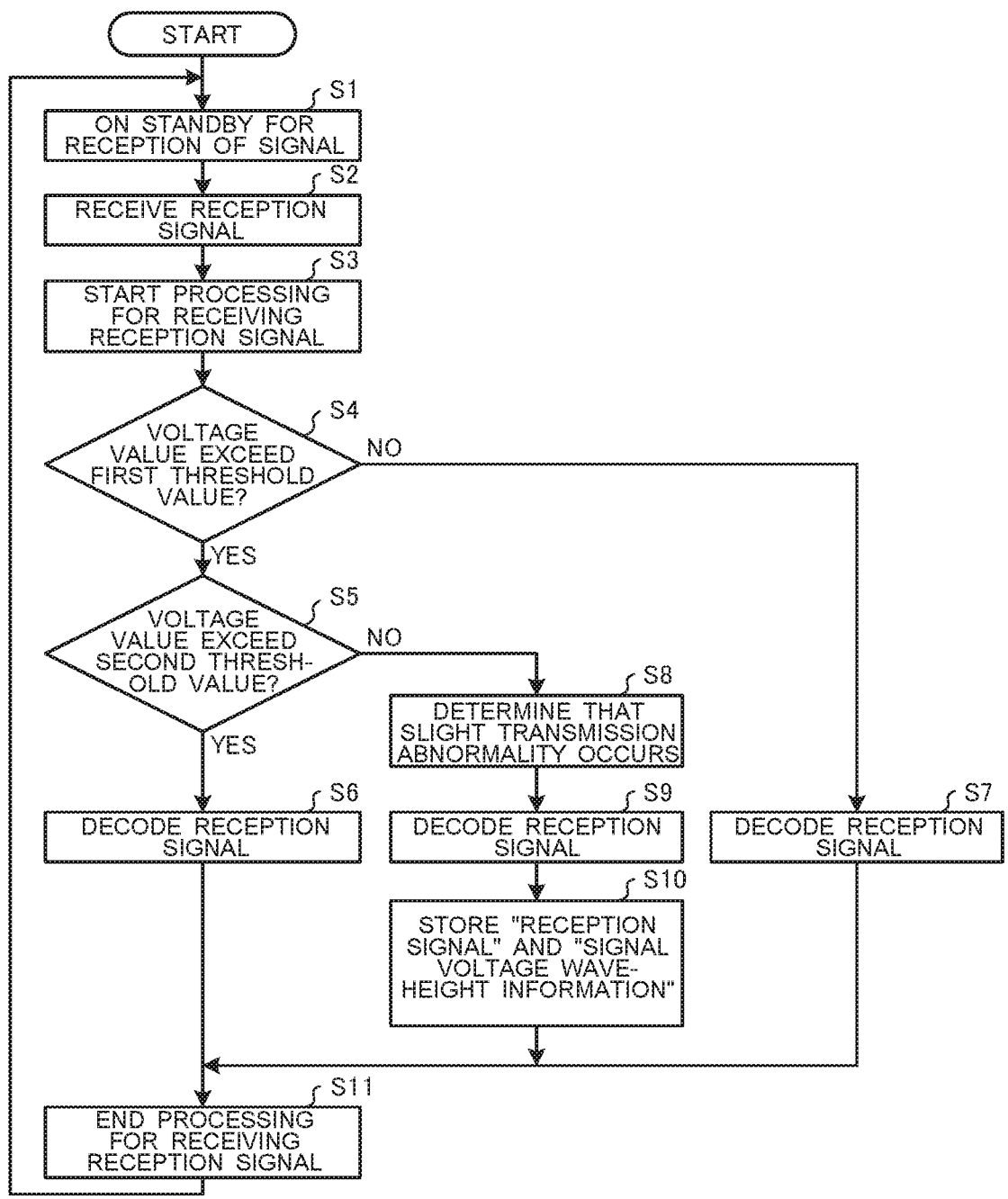
FIG. 4 is a flowchart for explaining a flow of processing to be performed when a signal is received in the transmission circuit of the air-conditioning apparatus according to embodiment 1.

FIG. 4 is a flowchart for explaining a flow of processing to be performed when a signal is received in the transmission circuit 13 of the air-conditioning apparatus 1 according to embodiment 1.

As illustrated in FIG. 4, in the case where the outdoor unit 2 receives a signal from the indoor unit 3, which is another facility apparatus, the transmission circuit 13 is on standby such that it can receive a reception signal from the transmission line 4 (step S1). Then, upon reception of the reception signal transmitted in the transmission line 4 through the terminal block 12 (step S2), the transmission circuit 13 starts reception processing on the reception signal (step S3).

Next in step S4, the transmission circuit 13 compares a reception voltage value which is a signal voltage value of the reception signal, with the first threshold value set in the decoding comparator 17r. As the result of this comparison, in the case where the reception voltage exceeds the first threshold value (Yes in step S4), the processing proceeds to step S5.

In step S5, the transmission circuit 13 compares the reception voltage value and the second threshold value set in the abnormality detection comparator 18 with each other. As the result of this comparison, in the case where the reception voltage value exceeds the second threshold value (Yes in step S5), the transmission circuit 13 decodes the reception signal to convert the reception signal into reception data (step S6). Then, the transmission circuit 13 supplies the reception data to the control circuit 14 through the data signal line 19. In this case, the reception data is normally decoded data.

In the case where the reception voltage value is smaller than or equal to the second threshold value (No in step S5), the processing proceeds to step S8. In step S8, the transmission circuit 13 determines that a slight transmission abnormality occurs in the transmission line 4, and produces signal voltage wave-height information based on the above reception voltage value.

Then, in step S9, the transmission circuit 13 decodes the reception signal into reception data. Also, the transmission circuit 13 supplies the reception data to the control circuit 14 through the data signal line 19.

Furthermore, in step S10, the transmission circuit 13 stores the reception signal and the signal voltage wave-height information produced in step S8 in the data storage device 15.

On the other hand, in step S4, in the case where the reception voltage value is smaller than or equal to the first threshold value (No in step S4), the transmission circuit 13 decodes the reception signal into reception data (step S7). Then, the transmission circuit 13 supplies the reception data to the control circuit 14 through the data signal line 19. The reception data is data not normally decoded.

After the reception signal is decoded into the reception data in the above manner, a series of processes end (step S11), and the processing returns to step S1. Then, the processes from step S1 to step S10 are cyclically repeated.

As described above, in the air-conditioning apparatus 1 according to embodiment 1, the plural facility apparatuses such as the outdoor unit 2 and the indoor unit 3 are connected to each other by the transmission line 4, and communication is performed between the facility apparatuses. The outdoor unit 2 includes the transmission circuit 13, which includes the abnormality detection comparator 18 provided to detect an abnormality in the transmission line 4, and detects an abnormality in the transmission line 4, and the data storage device 15 provided to store the reception signal and the signal voltage wave-height information indicating that the abnormality in the transmission line 4 is detected. The transmission circuit 13 compares the voltage value of the reception signal received from the indoor unit 3 and the second threshold value preset in the abnormality detection comparator 18 with each other. In the case where the voltage value of the reception signal is smaller than or equal to the second threshold value, the transmission circuit 13 determines that the transmission line 4 is abnormal, and produces the signal voltage wave-height information. Then, the transmission circuit 13 stores the signal voltage wave-height information together with the reception signal in the data storage device 15.

In such a manner, the reception voltage value and the threshold value are compared with each other using the abnormality detection comparator 18, and in the case where the reception voltage value is smaller than or equal to the second threshold value, it is determined that an abnormality occurs in the transmission line 4. At this time, the second threshold value is set to a value greater than the first threshold value, which is set in the decoding comparator 17. Therefore, the air-conditioning apparatus 1 according to embodiment 1 can reliably detect even such a slight abnormality in the transmission line as to have no influence on decoding to be normally performed, since the second threshold value is greater than the first threshold value.

Furthermore, since the abnormality in the transmission line 4 can be detected at the point of time when the abnormality is still relatively slight, it is possible to take countermeasures against a communication abnormality before the abnormality of the transmission line 4 progresses into a severe abnormality and then into a communication abnormality.

Furthermore, in a related-art air-conditioning apparatus, in order to identify a cause of failure of normally decoding of a reception signal into reception data, it is necessary that a transmission signal analyzer for analyzing the reception signal and a data analyzer such as a personal computer (PC) are connected to the terminal block 12 to directly extract the reception signal and analyze the reception signal.

By contrast, in the air-conditioning apparatus according to embodiment 1, in the case where it is determined that an abnormality occurs in the transmission line 4, the reception signal and the signal voltage wave-height information are stored in the data storage device 15. Therefore, without connecting the data analyzer to the air-conditioning apparatus 1 as required in the related-art air-conditioning apparatus, the cause of the abnormality in the transmission line 4 can be easily identified by extracting the information stored in the data storage device 15 and checking the reception signal and the signal voltage wave-height information. Furthermore, it can be determined as supposition which facility apparatus or transmission line 4 has the abnormality, and which portion of the facility apparatus or transmission line 4 has the abnormality, and the cause of the abnormality can be narrowed down.

Furthermore, in embodiment 1, the data analyzer does not need to be connected to the air-conditioning apparatus 1. Therefore, it is not necessary to ask a customer to permit the data analyzer to be connected to the air-conditioning apparatus 1, and not necessary to prepare a power source for the data analyzer. In addition, it is not necessary to set a time period in which the connection of the data analyzer is permitted. Therefore, a time period for acquiring data is not limited.

Embodiment 2

Next, an air-conditioning apparatus according to embodiment 2 of the present invention will be described.

In the following description, elements which are same as those in embodiment 1 are denoted by the same reference symbols, and their detailed descriptions are omitted.

[Configuration of Air-Conditioning Apparatus]

The air-conditioning apparatus 1 according to embodiment 2 differs from the air-conditioning apparatus 1 according to embodiment 1 described above on the point that the air-conditioning apparatus 1 according to embodiment 2 includes plural abnormality detection comparators 18 which detect an abnormality in the transmission line 4. In the following, the configuration of the air-conditioning apparatus 1 according to embodiment 2 is described by referring mainly to the differences between the configuration of the air-conditioning apparatus 1 according to embodiment 2 and that of embodiment 1.

In embodiment 2, in the data storage device 15 as illustrated in FIG. 2, signal voltage wave-height initial information indicating information on a reception signal, which is received normally from each of the plural facility apparatuses such as the outdoor unit 2 and the indoor unit 3, is stored in advance in association with each of the facility apparatuses. This is because the amount of attenuation caused by the line resistance of the transmission line 4 varies in accordance with the locations at which the facility apparatuses are installed, and as a result the signal voltage at the time when the reception signal is normal varies from one facility apparatus to another.

Figure 5:
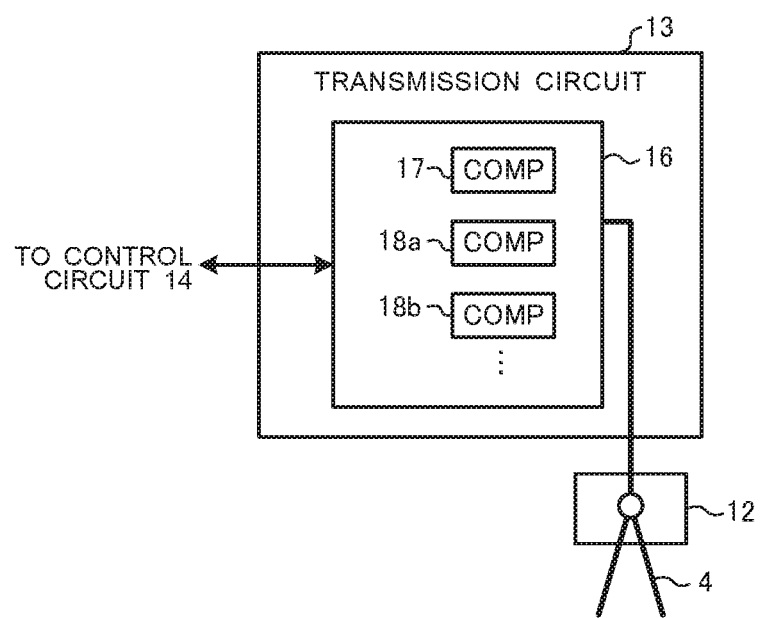
FIG. 5 is a block diagram illustrating an example of the configuration of a transmission circuit provided in an outdoor unit of an air-conditioning apparatus according to embodiment 2 of the present invention.

The signal voltage wave-height initial information is information indicating a relationship between the signal voltage of a reception signal at the time when the reception signal is received normally from a facility apparatus and the second threshold value set in each of the plural abnormality detection comparators 18a, 18 . . . , which will be described later FIG. 5 is a block diagram for illustrating an example of the configuration of the transmission circuit 13 included in the outdoor unit 2 of the air-conditioning apparatus 1 according to embodiment 2.

As illustrated in FIG. 5, the transmission and reception circuit 16 provided in the transmission circuit 13 includes the decoding comparator 17 and the plural abnormality detection comparators 18a, 18b, . . . .

The plural abnormality detection comparators 18a, 18b, . . . are provided to detect an abnormality in the transmission line 4 as embodiment 1. The second threshold values, which are different from each other in magnitude, are preset in the respective abnormality detection comparators 18a, 18b, . . . .

For example, the second threshold values are changed to different values at regular intervals. However, this is not limitative. For example, the second threshold values may be set in accordance with the signal voltages of reception signals at the time of normally receiving the reception signals from the respective facility apparatuses connected to the transmission line 4.

The larger the number of the plurality of abnormality detection comparators 18a, 18b, . . . , the smaller the intervals at which each of the second threshold values is changed, thereby improving the accuracy of detection of an abnormality. Therefore, accuracy of the detection of the abnormality in the transmission line 4 can be improved. However, the number of abnormality detection comparators 18a, 18b, . . . , provided, the higher the cost thereof. It is therefore preferable that the number of abnormality detection comparators 18a, 18b, . . . be determined in consideration of the above cost and accuracy of detection of abnormality.

When receiving a reception signal from a facility apparatus, the transmission circuit 13 compares the signal voltage of the reception signal and the second threshold values set in the respective plurality abnormality detection comparators 18a, 18b, . . . , and produces signal voltage wave-height information in accordance with the result of this comparison.

Furthermore, the transmission circuit 13 decodes the reception signal into reception data to specify a facility apparatus which has transmitted the reception signal.

The decoded reception data includes at least transmission-side information such as a transmission-side address for specifying a facility apparatus which has transmitted a reception signal. Based on the transmission-side information, the transmission circuit 13 can specify the facility apparatus that has transmitted the reception signal.

Then, the transmission circuit 13 compares the signal voltage wave high-voltage information produced based on the reception signal with the signal voltage wave-height initial information associated with the facility apparatus having transmitted the reception signal, that is stored in the data storage device 15. From the result of this comparison, if it is found that the above produced signal voltage wave high-voltage information and the above stored signal voltage wave high-voltage information do not coincide with each other, the transmission circuit 13 determines that an abnormality occurs in the transmission line 4. The term "coincide" in the above case means that the relationship between the reception signal and the second threshold value, which is indicated by one of the above two information "completely coincide with" that indicated by the other.

[Processing for Receiving Reception Signal]

Figure 6:
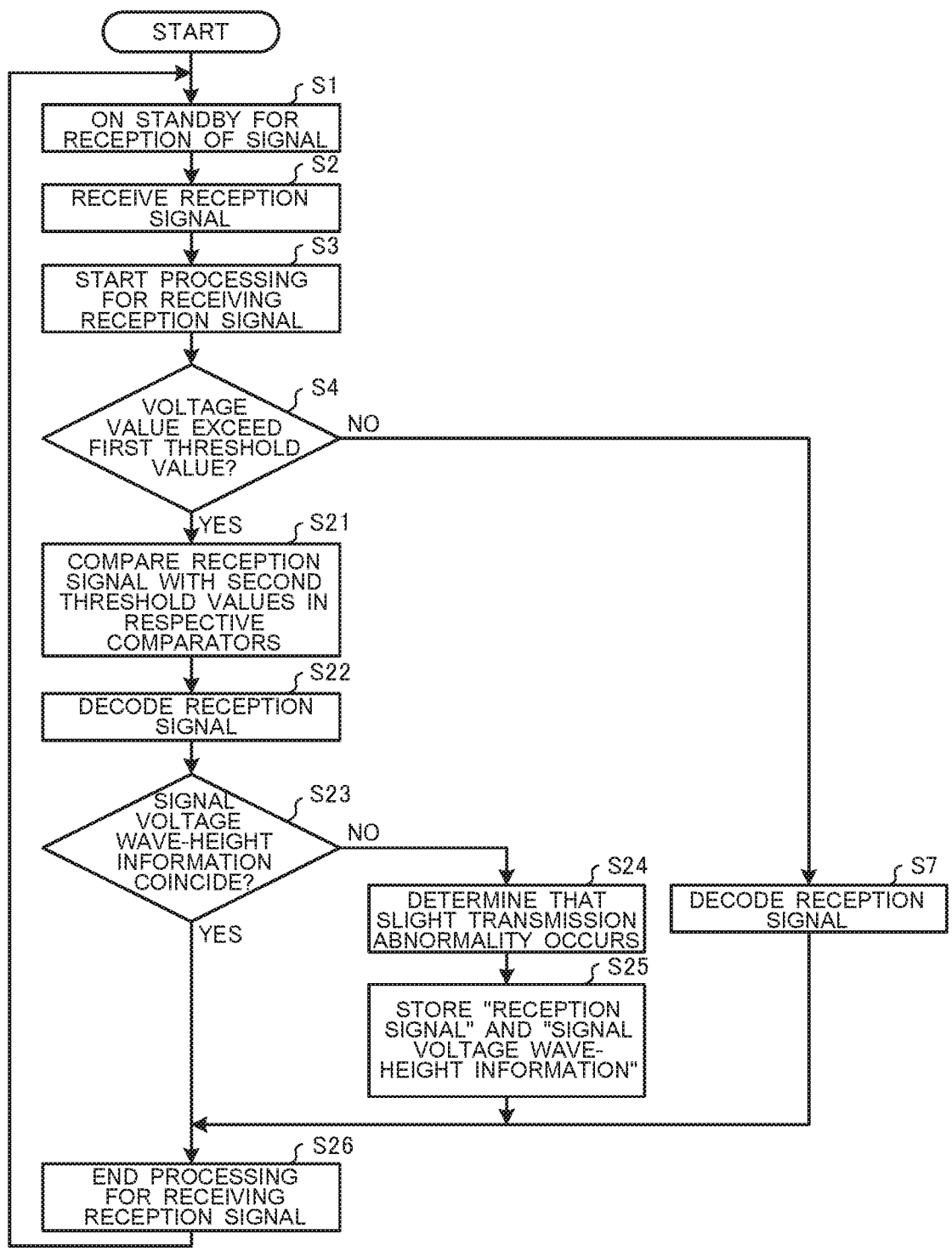
FIG. 6 is a flowchart for explaining a flow of processing to be performed when a signal is received in the transmission circuit of the air-conditioning apparatus according to embodiment 2.

FIG. 6 is a flowchart for explaining a flow of processing to be performed when a signal is received in the transmission circuit 13 of the air-conditioning apparatus 1 according to embodiment 2.

In the following description, processes which are the same as those of embodiment 1 are denoted by the same reference signs, and their detailed descriptions are omitted.

After a process of receiving a reception signal from a facility apparatus is started in steps S1 to S3, the transmission circuit 13 compares a reception voltage value, which is the signal voltage value of the reception signal, with a first threshold value set in the decoding comparator 17. As the result of the comparison, if the reception voltage value is greater than the first threshold value (Yes in step S4), the processing proceeds to step S21.

In step S21, the transmission circuit 13 compares the reception voltage value with the second threshold values set in the respective plurality of abnormality detection comparators 18a, 18b, . . . , and produces signal voltage wave-height information in accordance with the result of the comparison.

Next, in step S22, the transmission circuit 13 decodes the reception signal into the reception data, and specifies a facility apparatus that has transmitted the reception signal based on transmission-side information included in the reception data. Also, the transmission circuit 13 supplies the decoded reception data to the control circuit 14 through the data signal line 19.

In step S23, the transmission circuit 13 compares the signal voltage wave-height information produced in step S21 with the signal voltage value high-value initial information stored in the data storage device 15, which is associated with the facility apparatus specified in step S22. Fs21 As the result of the comparison, if the signal voltage wave-height information and the signal voltage wave-height initial information coincide with each other (Yes in step S23), the produced signal voltage wave-height information is discarded. Then, the processing proceeds to step S26.

By contrast, if the signal voltage wave-height information and the signal voltage wave-height initial information do not coincide with each other (No in step S23), the transmission circuit 13 determines that a slight transmission abnormality occurs in the transmission line 4 (step S24). Then, the transmission circuit 13 stores the reception signal and the signal voltage wave-height information in the data storage device 15 (step S25).

Furthermore, when the reception voltage value is smaller than or equal to the first threshold value in step S4 (No in step S4), the transmission circuit 13 decodes the reception signal into the reception data (step S7). Then, the transmission circuit 13 supplies the reception data to the control circuit 14 through the data signal line 19.

In such a manner, the above series of processes end upon decoding of the reception signal into the reception data and production of the signal voltage wave-height information (step S26), and the processing returns to step S1. Then, the processes of steps S1 to S26 are cyclically repeated.

As described above, in the air-conditioning apparatus 1 according to embodiment 2, the transmission circuit 13 includes the plural abnormality detection comparators 18a, 18b, . . . having different threshold values as the abnormality detection comparator 18. The data storage device 15 stores, with respect to each of the plural facility apparatuses, a signal voltage wave-height initial information indicating information regarding a reception signal at the time of normally receiving the reception signal from each of the plural of facility apparatus. When the reception signal is received through the transmission line 4, the transmission circuit 13 compares the reception voltage value, which is a voltage value of a reception signal, with the second threshold values of the respective abnormality detection comparators 18a, 18b, . . . , and produces signal voltage wave-height information indicating the relationships between the reception voltage value and the threshold values of the respective abnormality detection comparators. The transmission circuit 13 compares the produced signal voltage wave-height information with the signal voltage wave-height initial information stored in the data storage device 15, which is associated with a facility apparatus that has transmitted the reception signal. When the signal voltage wave-height information and the signal voltage wave-height initial information do not coincide with each other, it is determined that the transmission line 4 is abnormal.

Such comparison of the plural information as described above is carried out for each of facility apparatuses, each of which has transmitted a reception signal, and signal voltage wave-height information associated with each of the facility apparatuses. As a result, it is possible to roughly determine at which part of the transmission line 4 an abnormality occurs.

For example, it is assumed that of the plural facility apparatuses, a facility apparatus A is installed furthest away from a facility apparatus which performs the above processing, and a facility apparatus B is installed second-farthest away from the facility apparatus which performs the above processing. In this case, if an abnormality in the transmission line 4 is detected based on the reception signal from the facility apparatus A, and is not detected based on the reception signal from the facility apparatus B, it can be determined that the abnormality occurs in part of the transmission line 4 that is located between the facility apparatus A and the facility apparatus B.

Embodiments 1 and 2 of the present invention are explained above, but the present invention is not limited to embodiments 1 and 2 of the present invention. Various modifications and applications can be made without departing from the gist of the present invention.

For example, in the above case, the data storage device 15 is provided on the control board 11 of the outdoor unit 2; however, this is not limitative. For example, the data storage device 15 may be a removable recording medium such as a secure digital (SD) memory card.

In such a manner, in the case where a removable recording medium is provided as the data storage device 15, recorded data can be easily extracted. Furthermore, even when an operator cannot directly remove the recording medium for the analysis of data, another person can remove the recording medium, and send the recording medium to the operator, as a result of which the data can be analyzed.

Furthermore, for example, a remote control which causes the air-conditioning apparatus 1 to be operated may be provided as a facility apparatus to be connected to the transmission line 4, and the data storage device 15 may be provided at the remote control. In this case, a signal voltage wave-height information produced when an abnormality is detected in the transmission line 4 is transmitted to the remote control from the outdoor unit 2 through the transmission line 4, whereby the signal voltage wave-height information can be stored in the data storage device 15.

As described above, since the data storage device 15 is provide at the remote control, the data can be easily extracted even when, for example, the outdoor unit 2 is installed at a location which an operator cannot easily approach, for example, the rooftop of a building.

Further, although the circuit which detects an abnormality in the transmission line 4 is provided at the outdoor unit 2 in the example described above, the location of the circuit is not limited thereto. For example, the circuit described above may be provided to another facility apparatus.

REFERENCE SIGNS LIST 1 air-conditioning apparatus 2 outdoor unit 3 indoor unit 4 transmission line 10 control box 11 control board 12 terminal block 13 transmission circuit 14 control circuit 15 data storage device 16 transmission and reception circuit 17 decoding comparator 18 abnormality detection comparator 19 data signal line 20 compressor 30 fan

The invention claimed is:

1. An air-conditioning apparatus comprising plural facility apparatuses which are connected to each other by a transmission line, and communicate with each other,
  wherein one of the plural facility apparatuses comprises:
    a transmission circuit including plural abnormality detection comparators having different threshold values for use in detection of an abnormality in the transmission line, the transmission circuit being configured to detect the abnormality in the transmission line; and
    a data storage device configured to store in advance, with respect to each of the plural facility apparatuses, signal voltage wave-height initial information indicating information regarding a reception signal from the each of the plural facility apparatuses through the transmission line, which is information at time of normally receiving the reception signal from the each of the plural facility apparatuses, and store the reception signal and signal voltage wave-height information indicating that the abnormality in the transmission line is detected, and
  wherein the transmission circuit is further configured to:
    compare a reception voltage value which is a voltage value of the reception signal with each of threshold values which are set in advance in the plural abnormality detection comparators, at the time of receiving the reception signal through the transmission line;
    produce signal voltage wave-height information indicating relationships between the reception voltage value and the threshold value of each of the plural abnormality detection comparators;
    compare the signal voltage wave-height information with the signal voltage wave-height initial information indicating information regarding the reception signal, which is associated with one of the plural facility apparatuses that has transmitted the reception signal; and
    determine that the transmission line is abnormal when the signal voltage wave-height information and the signal voltage wave-height initial information fail to coincide with each other.

2. An air-conditioning apparatus comprising plural facility apparatuses which are connected to each other by a transmission line, and communicate with each other,
  wherein one of the plural facility apparatuses comprises:
    a transmission circuit which includes an abnormality detection comparator configured to detect an abnormality in the transmission line, and a decoding comparator configured to determine whether a first reception signal received from another one of the plural facility apparatuses through the transmission line is normally decodable or not; and a data storage device configured to store a second reception signal for use when the abnormality in the transmission line is detected and signal voltage wave-height information indicating that the abnormality in the transmission line is detected, wherein the transmission circuit is further configured to:
compare a voltage value of the first reception signal received from another one of the plural facility apparatuses with a threshold value set in advance in the abnormality detection comparator;

determine that the transmission line is abnormal when the voltage value of the first reception signal is smaller than or equal to the threshold value; and produce the signal voltage wave-height information, and store the signal voltage wave-height information together with the second reception signal for use when the abnormality in the transmission line is detected in the data storage device, and wherein the threshold value of the abnormality detection comparator is set to a value greater than a decoding comparator threshold value preset in the decoding comparator.

3. The air-conditioning apparatus of claim 1, wherein the data storage device includes a removable recording medium.

4. The air-conditioning apparatus of claim 1,
wherein a remote control is provided as one of the plural facility apparatuses, and connected to the transmission line, and
wherein the data storage device is provided at the remote control.

5. A method of detecting an abnormality in a transmission line configured to connect plural facility apparatuses included in an air-conditioning apparatus, the method causing one of the plural facility apparatuses to perform:
comparing a reception voltage value which is a voltage value of a reception signal received from another one of the plural facility apparatuses with each of threshold values which are set in advance in plural abnormality detection comparators configured to detect the abnormality occurring in the transmission line, at the time of receiving the reception signal through the transmission line;

producing signal voltage wave-height information indicating relationships between the reception voltage value and the threshold values of the plural abnormality detection comparators;

comparing the produced signal voltage wave-height information with signal voltage wave-height initial information indicating the reception signal, which is associated with one of the plural facility apparatuses that has transmitted the reception signal; and determining that the transmission line is abnormal when the signal voltage wave-height information and the signal voltage wave-height initial information fail to coincide with each other.

6. The air-conditioning apparatus of claim 1,
wherein the transmission circuit further comprises a decoding comparator configured to determine whether the reception signal is normally decodable or not, and
the threshold value of the abnormality comparator is set to a value greater than a predetermined threshold value.

* * * * *